(12) United States Patent
King et al.

(10) Patent No.: US 7,883,623 B2
(45) Date of Patent: Feb. 8, 2011

(54) DISPENSING SYSTEM

(75) Inventors: Joseph A. King, Wayzata, MN (US); Jeffery Johnson, Minneapolis, MN (US); Marlin Frank, Minneapolis, MN (US)

(73) Assignee: King Technology, Hopkins, MN (US)

( * ) Notice: Subject to any disclaimer, the term of this patent is extended or adjusted under 35 U.S.C. 154(b) by 183 days.

(21) Appl. No.: 12/313,401

(22) Filed: Nov. 20, 2008

(65) Prior Publication Data

US 2009/0071891 A1    Mar. 19, 2009

Related U.S. Application Data

(62) Division of application No. 11/354,291, filed on Feb. 14, 2006, now Pat. No. 7,507,331, which is a division of application No. 10/636,821, filed on Aug. 7, 2003, now Pat. No. 7,052,615.

(60) Provisional application No. 60/432,189, filed on Dec. 10, 2002.

(51) Int. Cl.
*B01D 11/02* (2006.01)
*C02F 1/76* (2006.01)

(52) U.S. Cl. .......... 210/167.11; 210/199; 210/237; 210/261; 210/282; 137/268; 239/57; 239/59; 239/310

(58) Field of Classification Search .......... 210/237, 210/238, 749, 752–754, 137, 198.1, 199, 210/205, 167.1, 167.11, 261, 262, 282; 137/8, 137/9, 268; 222/71, 145.1, 396; 239/310, 239/57–59; 422/261, 263, 264; 224/254
See application file for complete search history.

(56) References Cited

U.S. PATENT DOCUMENTS

| | | | | |
|---|---|---|---|---|
| 3,837,574 A | * | 9/1974 | Curran | .......... 239/57 |
| 4,416,775 A | * | 11/1983 | Halbich et al. | .......... 210/236 |
| 4,630,634 A | * | 12/1986 | Sasaki et al. | .......... 137/268 |

(Continued)

*Primary Examiner*—Frank M Lawrence
(74) *Attorney, Agent, or Firm*—Jacobson & Johnson LLC

(57) ABSTRACT

A dispenser system that takes high pressure fluid such as a high pressure water source and reduces the volume flow of the high pressure water as it flows into a dispenser with the dispenser having a low pressure outlet, which offers negligible fluid resistance in comparison to the inlet fluid resistance to the dispenser, thereby ensuring that if a dispenser cap is accidentally removed from the dispenser while the unit is in operation the water will not spray out into and onto the user. The dispensing system includes a removable cartridge carrier with adjustable openings and a dispenser housing that one can maintain a uniform flow pattern under different flow rates to provide for a predicable control of a dispersion rate from a dispersant located in the system and a method of predictably changing the dispersion rate of a dispersant.

9 Claims, 5 Drawing Sheets

U.S. PATENT DOCUMENTS

| | | | |
|---|---|---|---|
| 4,634,089 A * | 1/1987 | Wright et al. | 248/311.2 |
| 4,691,732 A * | 9/1987 | Johnson et al. | 137/268 |
| 4,702,270 A * | 10/1987 | King, Sr. | 137/268 |
| 5,053,206 A * | 10/1991 | Maglio et al. | 422/264 |
| 5,055,183 A * | 10/1991 | Buchan | 210/85 |
| 5,232,137 A * | 8/1993 | Devine | 224/666 |
| 5,251,656 A * | 10/1993 | Sexton, Sr. | 137/1 |
| 5,384,102 A * | 1/1995 | Ferguson et al. | 422/264 |
| 5,407,567 A * | 4/1995 | Newhard | 210/198.1 |
| 5,427,748 A * | 6/1995 | Wiedrich et al. | 422/284 |
| 5,580,448 A * | 12/1996 | Brandreth, III | 210/206 |
| 5,810,228 A * | 9/1998 | Brokering | 224/414 |
| 5,938,160 A * | 8/1999 | Hartmann et al. | 248/311.2 |
| 6,123,842 A * | 9/2000 | Buchan | 210/167.11 |
| 6,190,547 B1 * | 2/2001 | King et al. | 210/167.11 |
| 6,957,779 B2 * | 10/2005 | Joshi et al. | 239/43 |

* cited by examiner

FIG. 3
FIG. 4
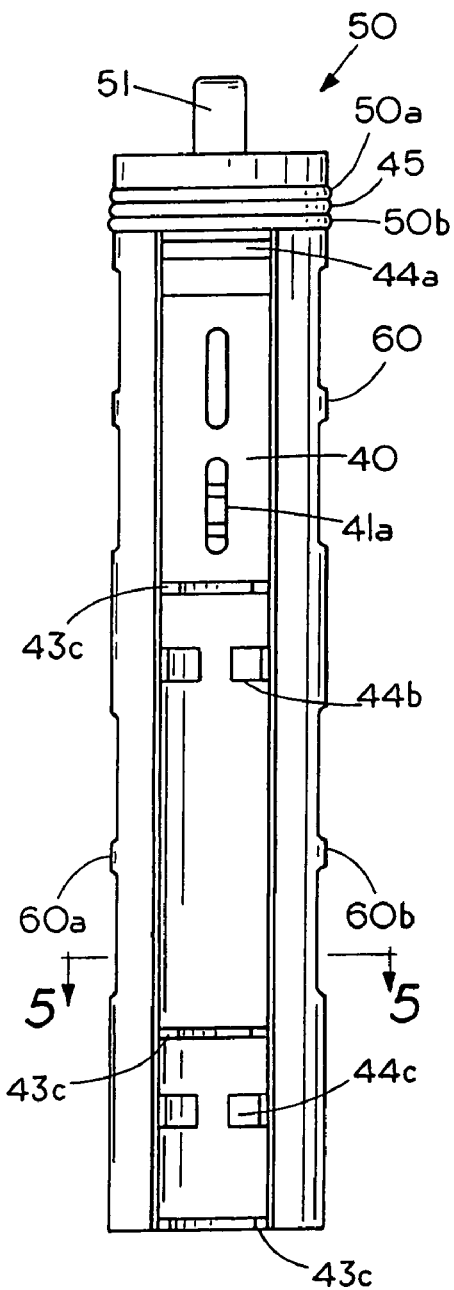
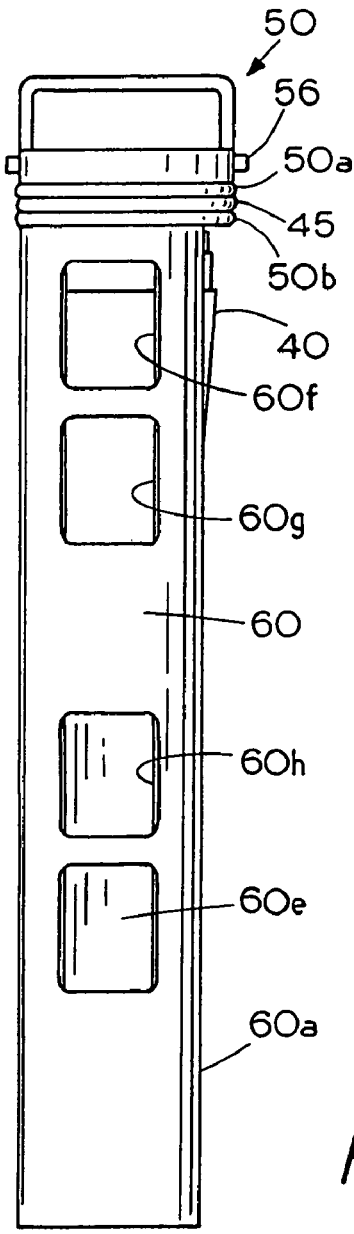
FIG. 5
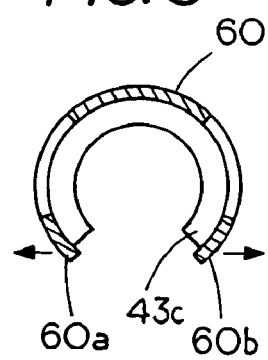

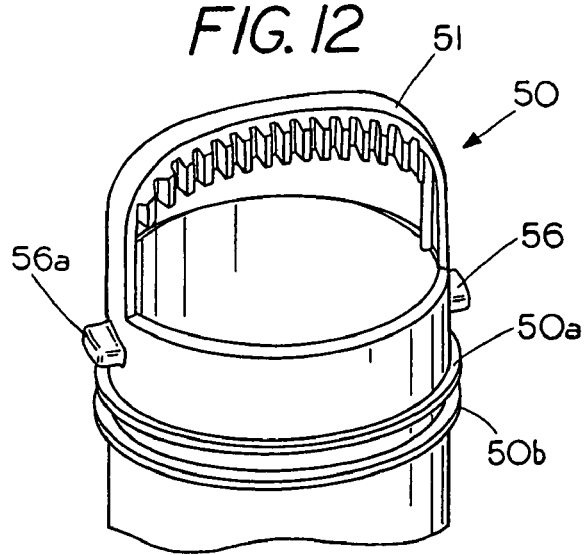
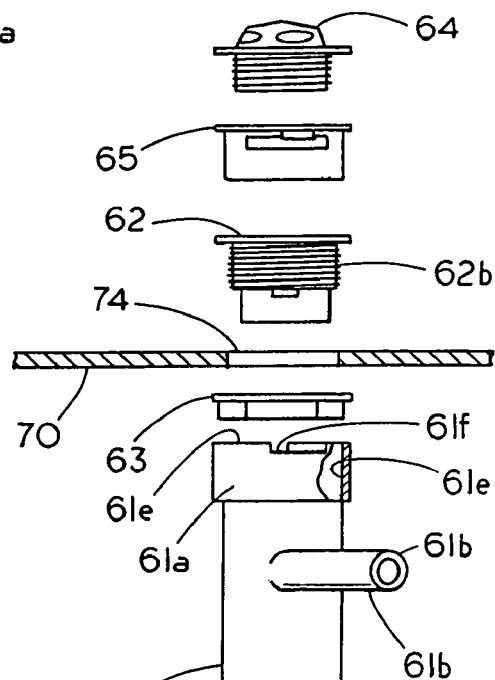
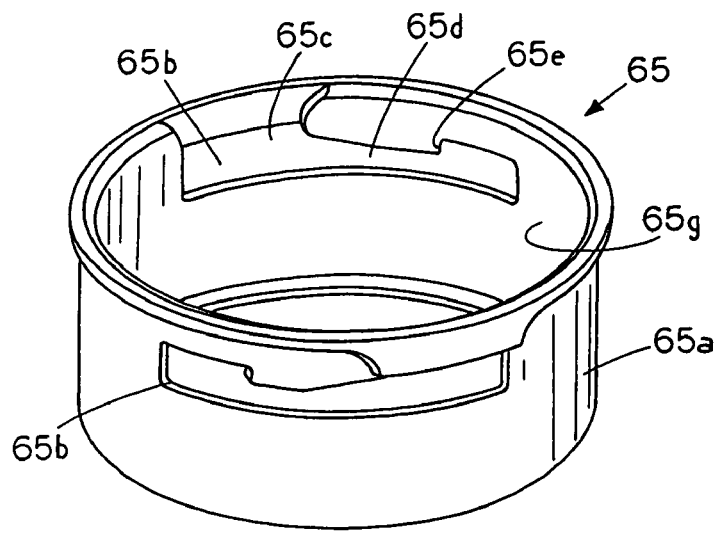

DISPENSING SYSTEM

CROSS REFERENCE TO RELATED APPLICATIONS

This application is a division of application titled DISPENSING SYSTEM Ser. No. 11/354,291, filed Feb. 14, 2006 now U.S. Pat. No. 7,507,331, which is a division of application titled DISPENSING SYSTEM Ser. No. 10/636,821, filed Aug. 7, 2003 (now U.S. Pat. No. 7,052,615), which claims priority from provisional application titled DISPENSER Ser. No. 60/432,189 filed Dec. 10, 2002.

FIELD OF THE INVENTION

This invention relates generally to dispensing and, more particularly, to dispensing apparatus and method for controlled treatment of fluids and in particular water used for drinking, work or pleasure and a method of incorporating a dispensing apparatus into a fluid system.

STATEMENT REGARDING FEDERALLY SPONSORED RESEARCH OR DEVELOPMENT

None

REFERENCE TO A MICROFICHE APPENDIX

None

BACKGROUND OF THE INVENTION

The concept of fluid treatment systems is generally known in the art. My U.S. Pat. No. 6,471,858 discloses a system where a dispenser is cantilevered mounted in a chamber of a sand filter to dispense materials into the fluid. My U.S. Pat. No. 6,328,900 discloses a kit and a method for converting a water circulation system to a water circulation and purification system where cartridges are held in a housing and fluid is flowed around the cartridges which are held in a housing.

The present invention provides a dispensing system wherein dispenser cartridges can be quickly and interchangeably placed into a fluid system with the system configured such that a person changing the dispenser cartridges is not accidentally exposed to a jet of high pressure liquid.

Another feature of the present invention is that if the dispenser cartridges are used they can be placed in a dispenser holder that allows one to remove all of the dispenser cartridges as a unit but allows one to replace only those dispenser cartridges that are spent.

One of desirable aspects of a dispensing system is that one should be able to control the amount of dispersant that is introduced into the fluid under different conditions. For example, in a hot tub one may want to release the dispersant at a first rate to maintain the proper concentration of dispersant in the hot tub if no one is using the hot tub. On the other hand, if many persons are using the hot tub one will want to increase the dispersant rate in order to maintain the proper concentration of dispersant in the hot tub. Similar conditions occur in other commercial applications where the concentration of the dispersant in the fluid dissipates due to internal or external factors. In these conditions one may want to have a higher dispersal rate to compensate for higher consumption of dispersants. Still in other situations one may have different dispersant materials that need to be dispersed at different rates yet both the dispersal rates may need to be simultaneously increased or decreased depending on the operating conditions Consequently, the dispersal system should enable a user to predictably deliver different dispersal rates for different conditions and to change the deliver rate for one or more dispensers that are contained within the system.

One embodiment of the present invention includes a fluid dispersant system utilizing dispersant cartridges that enables one to predictably control the dispersant rate into a fluid by controlling the flow pattern past a dispensing cartridge.

SUMMARY OF THE INVENTION

A dispenser system that takes high pressure fluid such as a high pressure water source and reduces the volume flow of the high pressure water as it flows into a dispenser with the dispenser having a low pressure outlet, which offers negligible fluid resistance in comparison to the inlet fluid resistance to the dispenser, thereby ensuring that if a dispenser cap is accidentally removed from the dispenser while the unit is in operation the water will not spray out into and onto the user. The dispensing system includes a cartridge carrier and a dispenser that can maintain a uniform flow pattern under different flow rates to provide for a predicable control of a dispersion rate of a dispersant located in the system.

In one embodiment a removable cartridge holder allows one to insert and hold multiple cartridges with treatment materials therein and to remove the cartridge dispensers therein en bloc and in another embodiment the dispenser system can be used without a cartridge dispenser with the treatment materials placed directly into a chamber in dispenser system.

In another embodiment a dispenser cartridge includes openings that have fluid access areas whose size can be increased or decreased to enable one to predictably change the rate of dispersant released into the fluid by increasing or decreasing the size of the fluid access areas.

BRIEF DESCRIPTION OF THE DRAWINGS

FIG. 3 is a front view of a cartridge carrier for holding one or more cartridges in the dispenser chamber in the dispensing system of FIG. 1; and FIG. 4 is a side view of a cartridge carrier of FIG. 3;

FIG. 5 is a cross sectional view of the cartridge carrier of FIG. 3 illustrating the flexible ears that permit lateral insertion of a cartridge therein;

FIG. 10 is a dispenser housing locking cam for securing in the dispenser housing of FIG. 6;

FIG. 11 shows an exploded view of a dispenser system positioned proximate a panel;

FIG. 12 is a pictorial view of the handle and locking mechanism on a cartridge carrier;

DESCRIPTION OF THE PREFERRED EMBODIMENT

Figure 1:
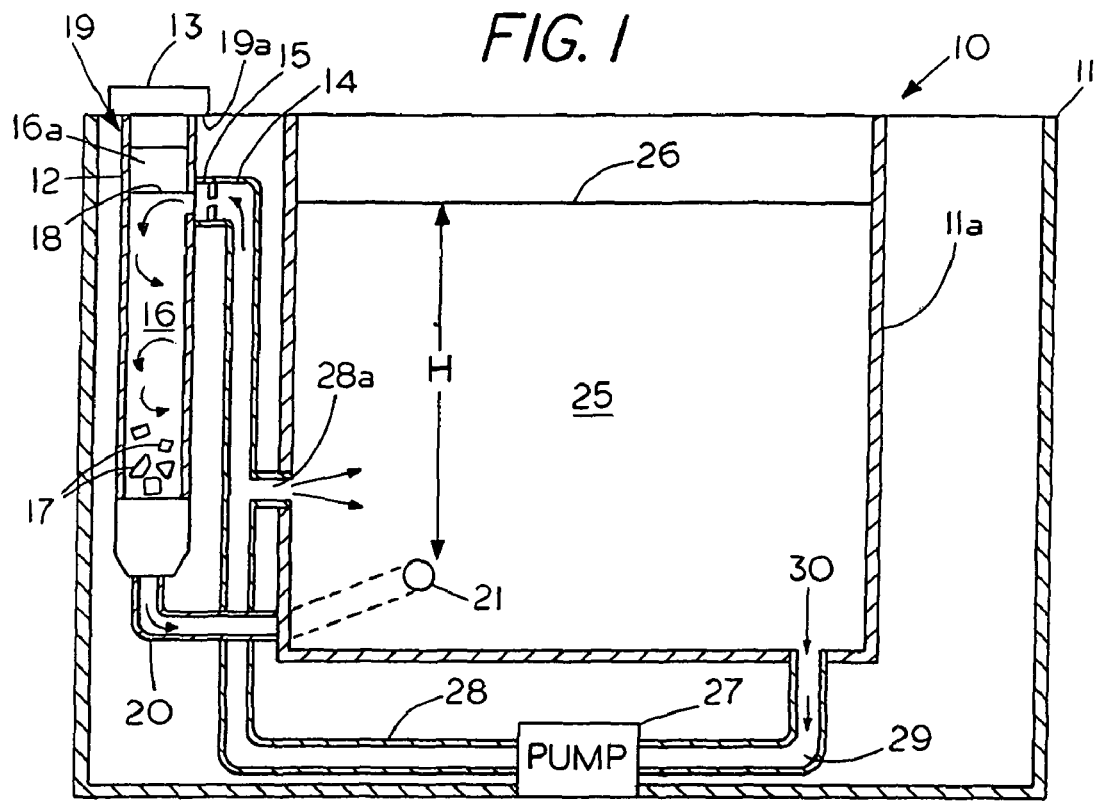
FIG. 1 is a cutaway view of a dispenser system having a container and dispenser for dispensing materials into the fluid in the container.

FIG. 1 is a cutaway view showing a dispenser system 10 with an outer housing 11 having an inner container 11a partially filled with a fluid such as water 25. Typically, system 10 can be used in a pool, spa or other fluid container where fluid treatment is required. For example, the system can be used for the water that is used either for work, pleasure or for drinking.

In the embodiment shown the container 11a is configured in a spa mode with an inlet 30 positioned to draw water into an inlet pipe 29 through a pump 27. Pump 27 increases the pressure of the water and forces the water in fluid conduit 28 on the outlet side of the pump to discharge under high pressure as a high pressure jet at underwater port 28a. The high pressure fluid jet can provide multiple functions, for example, in a hot tub, the high pressure fluid jet produced by the pump system circulates the water in the hot tub thus ensuring that the water purification materials are dispersed throughout the tub. In addition, the high pressure jet produced by the pump system can also provide a water massages as a user sits in the tub. A further use of a portion of the stream of fluid can occur when fluid is diverted to a dispensing housing to allow the fluid to flows past a dispersant material that is contained in the dispenser housing.

In the present invention the high pressure line 28 is in fluid communication with a dispenser 19 which is mounted in the housing 11. Dispenser 19 comprises a housing that contains a dispenser inlet 14 with a fluid restriction 15 in the form of a small aperture with a cross sectional flow diameter on the order of 0.010 of an inch while the cross sectional flow diameter of the line 28 and nozzle outlet 28a may be two inches or more. It will be appreciated that the cross sectional area or size of the aperture 15 and the cross sectional area or size line 28 can be scaled up or down to accommodate various flow conditions but that the ratio of the difference in cross sectional area produces a low pressure region in the dispenser. Thus, in the present invention, a purpose of the restriction 15 is to limit the volume flow of high pressure water into chamber 16 in the dispenser 19 but still provide for flow of water at a lower pressure through chamber 16.

In the embodiments shown in FIG. 1 the dispenser 19 contains an open dispersant chamber 16 for placing or retaining dispersant materials therein. That is, cap 13 can be removed and typical materials such as bromine sticks 17 can be dropped in chamber 16. Located in the bottom portion of chamber 16 in dispenser 19 are the water purification materials 17 or other fluid treatment materials. In one embodiment dissolvable materials 17 such as halogens and particularly halogens such as bromine or chlorine tablets are placed directly into chamber 16 by removal of cap 13 which threadingly engages a male thread on dispenser 19. In operation of the system of FIG. 1, the top inlet 14 of dispenser 19 receives water under high pressure but low volume flow since only a small amount of water can flow through the restriction 15. With the cap 13 on dispenser 9 the pressure in the chamber 16 rises sufficient to force water to flow, albeit at a slow velocity, through the dispenser chamber 16 and into the container 11a through outlet 21. As shown in FIG. 1 dispenser 19 includes an air pocket 16a above the water line 18 of the water in the dispenser 19. It should be understood that the top end 19a of dispenser is located above the water line 26 in the container 11a and that the bottom discharge port offers little resistance to fluid returning to container 11a. Consequently, if the cap 13 is not on the dispenser 13 the water will not flow out of dispenser 19 but will seek its own level, namely the level indicated by water line 26 in container 11a since there is little resistance to flow of water out of the port 21 in dispenser 19.

A further feature of the invention is that the liquid level in the dispenser 19, which is indicated by reference numeral 18 and the air pocket 16a combine to provide a reservoir or chamber for fluid. That is, the water flows in the directions indicated by arrows in FIG. 1. The water flows through chamber 16 and out passage 20 and is discharged into container 11a through port 21 which is located below the water line 26. The egress passage 20 is characterized by having a substantially larger diameter than the diameter of the restrictor 15 so as not to impede the flow of water therethrough. As a result, the high pressure low volume flow of water entering the dispenser 16 is forced through the dispenser 19 and into the bottom of the container 11a where the discharge pressure is primarily determined by the depth of the water "h" below the water line. The presence of the air pocket 16a ensures that if the cap is removed it will be air that escapes from the dispenser rather than the fluid in the chamber. The maintenance of an air pocket in the dispenser housing insures that the fluid level in the system will be below the top of the dispenser housing so that removal of cap 13 will not cause fluid to spill from the housing. Thus in the present system the water discharges into a low pressure region in the bottom of container 11a. If someone should accidentally remove cap 13 the pressure of water entering into the dispenser arrives at a low volume flow with the stream of water directed away from the top opening 19a to prevent any water or dispenser materials from being blown back at the person as the cap 13 is removed. In addition, the air pocket 16a can provide a reservoir chamber to absorb water flowing into the dispenser 19. That is, even with the outlet 21 blocked there is a time lag of several minutes before the water would flow out the top of dispenser 19 thus giving a person time to shut off the recirculation system.

In normal operation, the pressure in air pocket 16a may rise slightly due to the fluid circulation resistance through the dispenser 19 and cause the air pocket 16a to compress slightly, however, once the cap 13 is removed the water level 18 in the dispenser 19 may rise slightly but under normally conditions the flow will continue to circulate through the dispenser since the fluid resistance to water discharging out the top 19a of the dispenser 19 is maintained at greater fluid resistance than the fluid resistance to water flowing though the dispenser 19 and back into the container 11a. In other words, the inlet 15 and the outlet 20 are sized such that if the water under pressure continues to come into the dispenser chamber 16 when the cap 13 is removed the water in the dispenser 19 will not rise over the top of the dispenser housing and spill out of the dispenser 19. That is, even though a slight increase in the water level 18 can occur water continues to flow through dispenser 19 and back into the container 11a thereby ensuring that unnecessary spills are avoided.

Figure 2:
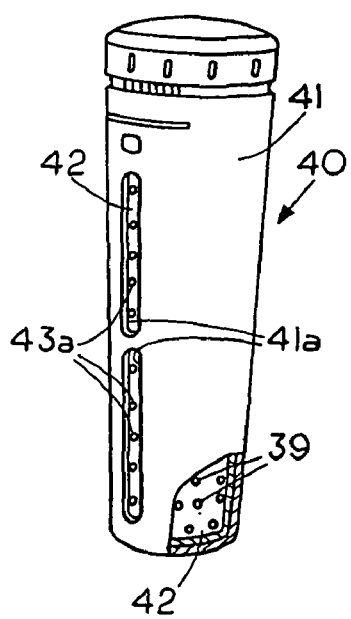
FIG. 2 is a perspective view of a cartridge for use in the dispenser system of FIG. 1.
Figure 6:
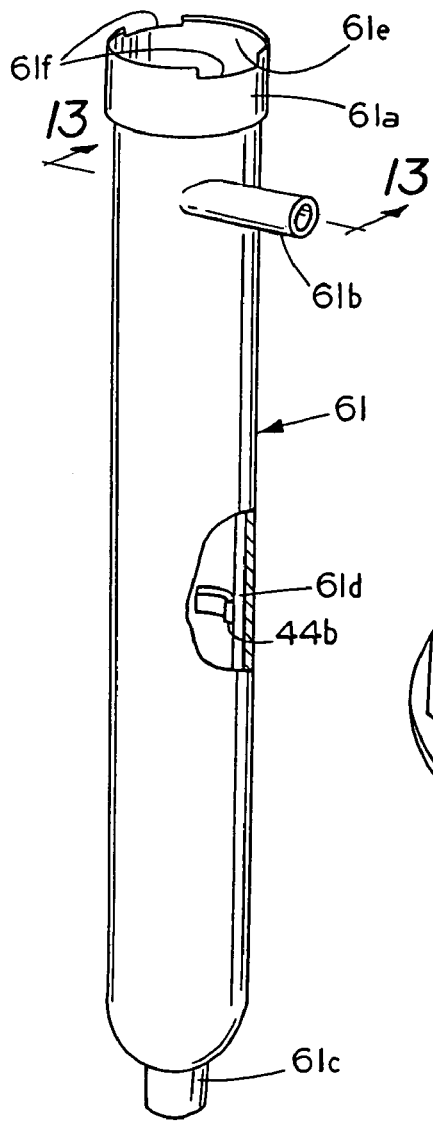
FIG. 6 shows an isolated view of a housing for peripherally introducing a fluid into the housing chamber.

In an alternate embodiment of the invention a removable cartridge or removable cartridges are placed in a cartridge holder that is removably positioned in a dispenser housing. FIG. 2 shows a front view of a cartridge dispenser 40 for receiving a typical fluid treatment material such as water purification material. Cartridge 40 comprises an outer sleeve 41 that is rotatable positioned with respect to an inner container 42 which contains a dispersant 39. A pair of elongated openings 41a allow fluid to flow enter container 42 through the openings 43a. Located in the bottom of container 42 is a dispersant material 39 such as minerals or the like which are used to treat water. Minerals 39 are different from chlorine or bromine tablets and the like which dissolve as they are used as minerals which do not dissolve need to be removed once the minerals have been spent. Thus the cartridge 40 comprises a dispersant holder that can be removed from a dispenser housing and replaced with a fresh cartridge. If desired cartridge 40 can be provided with a flotation chamber 45 that is attached directly to the cartridge 40 so the cartridge will float to the top of the dispenser chamber 16 for easy access and thus removal.

In another embodiment of the invention a cartridge dispenser is carried by a cartridge holder. FIG. 3 shows a cartridge carrier or cartridge holder 50 for holding one or more cartridges in an end to end condition. Cartridge carrier 50 includes a handle 51 and an open body skeleton housing 60 having elongated flexible circumferential edges or ears 60a and 60b as part of the skeleton housing. The purpose of the skeleton housing is to allow water to flow through the skeleton housing and into and out of the cartridge held therein while at the same time provide a convenient tool for holding the cartridges in position in the dispenser housing and for removing the cartridges from the dispenser housing. Carrier 50 contains a first circumferential lip 50a that is spaced from a second circumferential lip 50b with a resilient sealing member such as an O-ring 45 located between the lips to allow one to seal the top of the cartridge carrier 50 to the inside of a dispenser housing to prevent flow past the top of the dispenser housing.

FIG. 4 shows a side view of cartridge carrier 50 revealing two ears 56 and 56a for locking the cartridge carrier 50 into a dispenser locating housing cam 65, which is shown in FIG. 10. Cartridge career 50 is preferable made from a polymer plastic that is flexibly thin yet sufficiently rigid to hold dispensing cartridges therein. Carrier 50 contains side openings 60f, 60e, 60g and 60h to permit ingress or egress of fluid through the skeleton housing 60. While only one cartridge dispenser 40 is shown in cartridge holder 50 additional cartridges holder can be placed in the cartridges holder to provide for different dispersants.

FIG. 5 shows a sectional view of the cartridge carrier 50 taken along lines 55 to show the cylindrical open body skeleton housing 60 with ears 60a and 60b being resiliently displaceable radially outward (see arrows) to allow lateral insertion of the cartridge 40 therein. A lower stop 43c extends around the bottom of the skeleton housing to hold the cartridge in position.

In order to hold a plurality of dispenser cartridges in a fixed position in the cartridge holder 50 reference should be made to FIG. 3 which shows internal circumferential bands that form a protruding partial circumferential ridge. That is, a top circumferential ridge 44a holds the top cartridge dispenser 40, a second identical partial circumferential ridge 44b can hold a second cartridge dispenser and a third identical partial circumferential ridge 44c located on skeleton housing 60 can hold a third dispensing cartridge therein. A circumferential mating stop, such as a mating circumferential recess 40a located on cartridge 40 allow one to maintain the cartridge 40 in the proper axial location in skeleton housing 60. The flexible ears 60a and 60b and the skeleton body 60 which flex radially outward can be configured to provide a slight frictional fit between the outer surface of the cartridge and the inner surface of the skeleton holder 60 to thereby hold the cartridge in position during insertion and removal of the cartridge from the dispensers as well as to avoid movement of the cartridge in the housing due to changing water conditions in the dispenser housing which could cause unnecessary noise.

FIG. 11 shows an exploded view of the portion of the dispensing system that is fixedly attached to a panel 70 and FIGS. 6-10 show the unassembled components for forming a dispensing system in either an existing fluid system or a new fluid system. The cartridge holder of FIG. 3 is placeable directly into the housing 61 shown in FIG. 6 and an isolated cross sectional view of the flow around the skeleton housing and the cartridge 12 is shown in general detail in FIG. 13.

In order to illustrate the attachment and operation of the system with dispersant cartridges reference should be made to the dispersant housing components illustrated in FIGS. 6-10. The dispersant housing 61 shown in FIG. 11 contains an upper end collar 61a for securement to a housing head, a circumferential inlet port 61b, a central chamber 61d with a dispenser 40 therein and a lower outlet 61c. Dispenser housing 61 is mountable below a panel on a water system and is connected to the inlet and outlets as illustrated in FIG. 1. Dispenser housing collar 61a includes an internal cylindrical surface 61e for mating with a dispenser housing head and an alignment notches 61f for engaging with alignment members in the dispenser housing head 62.

Figure 7:
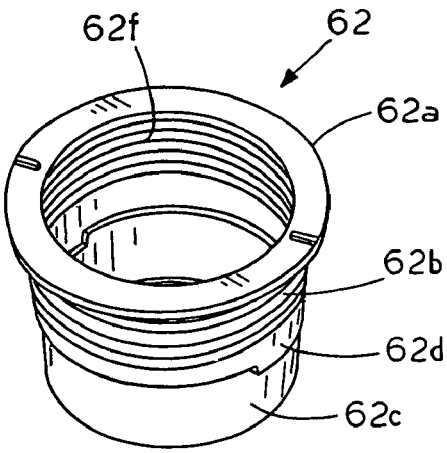
FIG. 7 is a pictorial view of a dispenser housing head for securing to the dispenser housing of FIG. 6.

FIG. 7 is a pictorial view of the dispenser housing head 62 that is securable to the dispenser housing 61 through an adhesive or solvent bonding or the like. That is, in the preferred embodiment dispenser housing 61 and dispenser housing head 62 can be made from materials such as a polymer plastic and can permanently secured to each other through adhesives or the like. Dispenser housing head 62 includes a circumferential lip 62a for securing above a panel to support the dispenser housing head thereon. Located along the body of dispenser housing head 62 is a set of external threads 62b, an alignment member 62d and a male cylindrical mating surface 62c for insertion into the female cylindrical surface 61e on dispenser housing 61. Located within housing head 62 is a set of internal threads 62f for engagement with a removable cover. The use of a separate dispenser housing 61 with a collar permits one to assembly the unit on a system through placement of parts above and below the panel of the unit that is receiving the dispensing system of the present invention.

Figure 8:
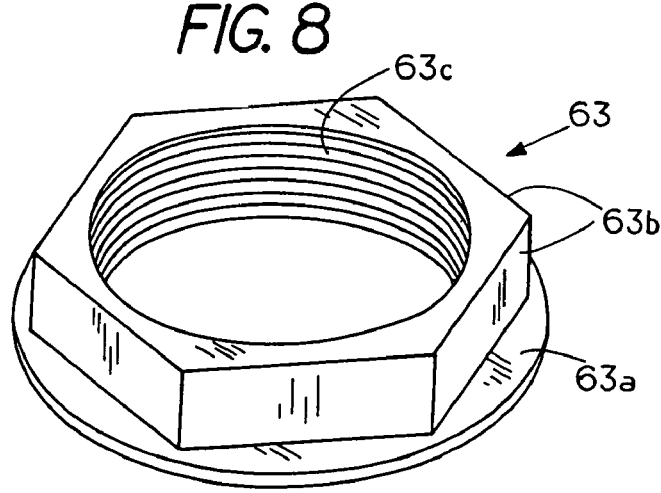
FIG. 8 is a pictorial view of a dispenser housing locking nut for securing the dispenser housing head to a panel on the system.

FIG. 8 is a pictorial view of a dispenser housing securement nut 63 having a set of internal threads 63c, a set of hexagon lands 63b to allow one to rotate the nut 63 and a flange 63a for abutment against a bottom side of a panel on a circulation system.

Figure 9:
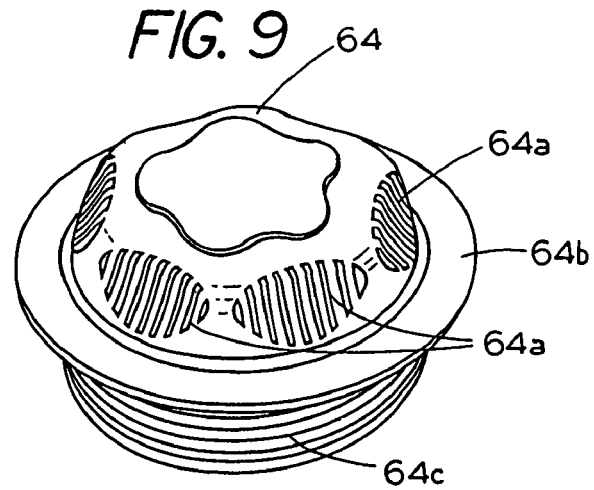
FIG. 9 is a dispenser housing cap for securement to the dispenser housing head shown in FIG. 7.

FIG. 9 is a pictorial view of a decorative cap 64 having a set of circumferentially spaced finger grips 64a. Cap 64 includes a flange 64b for abutting attachment to the top of the dispenser housing head 62 and a set of external male threads 64c for engaging female threads 62d on dispenser housing head 62.

FIG. 10 is a pictorial view of the dispenser housing locking cam collar 65 that is mounted in dispenser housing head 62 to enable one to lock a dispenser cartridge carrier 50 in position. Cam collar 65 includes a cylindrical body 65a with openings 65b on each side. Openings 65b includes a vertical slot region 65c and a lateral slot 65d with a lip 65e extending therein to lock a dispenser carrier therein. That is one pushes the cartridge carrier 50 (see FIG. 12) down with ears 56 and 56a located in alignment with the vertical; slot region 65c and an identical vertical slot region on the opposite side. Once lowered the cartridge carrier is rotated to cause the ears 56 and 56a engage lateral stops 65b and 65c to retain the cartridge carrier therein.

FIG. 11 shows a pictorial exploded view of a panel 70 and a dispensing cartridge housing 61 to reveal the members 64, 65 and 62 are located above the panel 70 and the nut 63 and dispenser housing 61 are positioned below the panel for the in situ assembly of the unit in a fluid circulation system.

A feature of the invention is that the system can be assembled on site as an after market item or can be mounted on original equipment during manufacture of the water circulation system using conventional techniques.

FIG. 11 shows that in the first step the dispenser housing head 62 is inserted though an opening 74 in a top panel 70. Once inserted the external threaded section 62b extends through the panel 70. Once threaded section 62b extends through the opening in panel 70 the housing nut 63 can be positioned on threads 62b and tightened to firmly secure the housing head 62 to panel 70. Thus the housing head 62 and housing nut 63 are sandwiched around panel 70. One is now in a position to complete the installation of the dispensing system.

With the housing head 62 secured to panel 70 the remaining components can be secured thereto from above and below the panel. That is, the dispenser housing 61, which is located below the panel 70, has internal mating surface 61e, which is securable to the external dispenser housing head cylindrical mating surface 62c, which extends through the panel. Preferably, the dispenser housing and dispenser housing head are formed of PVC pipe and can be joined together through the use of solvent cement or the like. By permitting the securement of the dispenser housing to the dispenser housing head below the panel, as shown in FIG. 5, one can maintain a minimum size opening in the panel yet permit lateral extension 61b on dispenser housing 61 since the dispenser housing 61 need not pass through the opening 71 in the panel 70.

Once the dispenser housing 61 and dispenser housing head 62 are secured to each other the dispenser housing locking collar 65 can be secured into the dispenser housing head 62, preferably through solvent cement or the like. The dispenser housing is now in a condition for receiving a cartridge carrier 50 and for locking the cartridge carrier in position therein.

In order to close the dispenser housing the dispenser cap 64 is secured to the female threads 62 in the dispenser housing head 62 though male threads 64c thereon. A sealing member such an is O-ring located beneath lip 64b to prevents fluids from escaping therepast.

Accordingly, a feature of the present invention is that the dispenser housing can be assembled in situ and secured to a fluid circulation system either in the field or as part of a manufacturing process through the steps of forming a hole in a panel, inserting a dispenser housing head therein, securing the dispenser housing head with a lock nut, securing the dispenser housing to the dispenser housing head while the dispenser housing head is secured to the panel. If a locking system for the cartridge carriers is required a locking collar can be secured to dispenser housing from above the panel 70. To close off the system a dispenser cap can be rotatable secured into the dispenser housing head to prevent leakage.

A feature of the present invention is that it can be incorporated into a fluid system either during the manufacture of the system or as an after market item. FIG. 5 shows an exploded view of the dispenser housing proximate a panel on a water system and FIGS. 6-10 show individual components of an embodiment of the present invention.

FIG. 12 shows a partial top view of the cartridge carrier 50 that includes a handle 51 and a cylindrical body having a first tab 56 and a second tab 56 for forming locking engagement with the locking cam collar 65 (FIG. 10).

Figure 13:
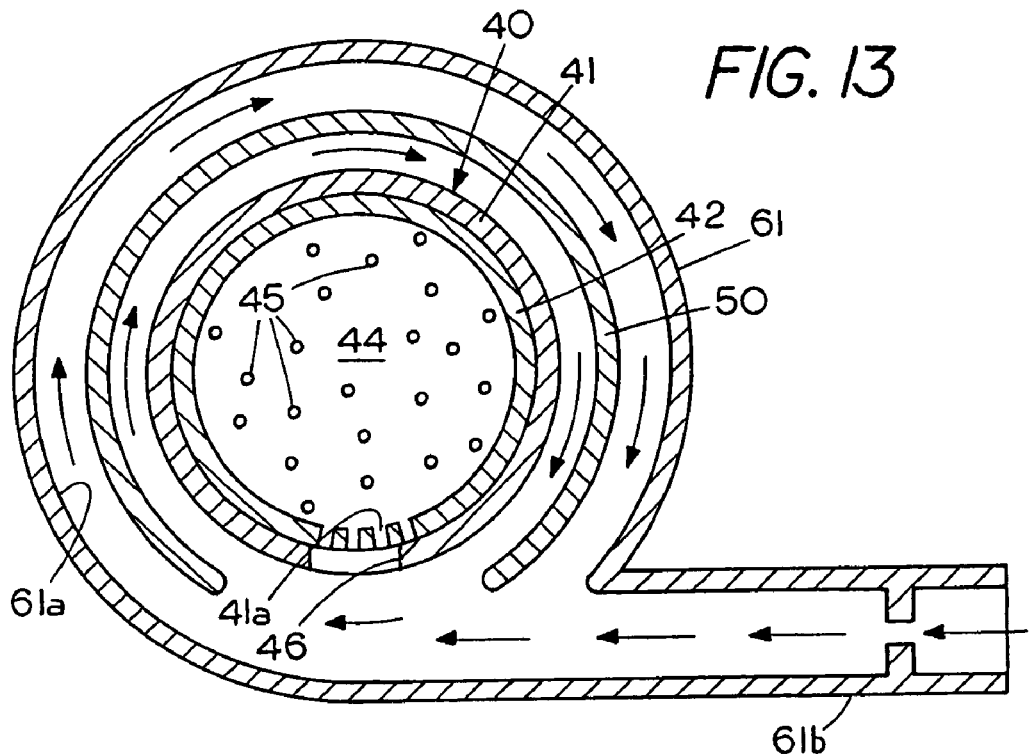
FIG. 13 is a cross section view of a cartridge dispenser suspended in a cylindrical chamber.

FIG. 13 shows a cross sectional view of housing 61 with a cartridge carrier 50 and a cartridge dispenser 40 coaxially positioned therein. A circumferential positioned port 61b directs the fluid between the peripheral surface 61g and the inner cartridge carrier 50 and cartridge dispenser 40. The introduction of the fluid circumferentially induces a downward vertical flow between upper entry port 61b and lower discharge port 61c. The arrows indicate the general circular flow around the dispenser housing 61 and dispenser cartridge 42 to allow the dispersant to be dispersed into the fluid in the container 10.

It has been found that by introducing fluid tangentially one can produce a stable uniform flow pattern, i.e. the fluid flows uniformly past the openings 46 and 41a even if the flow rates are changed. By maintaining a stable flow pattern past the openings 46 and 41a it allows one to predictably control the dispersant rate by changing the flow rate. That is, the faster the flow rate past the cartridge 40 the greater the dispersant rate and conversely the slower the flow rate the slower the dispersant rate.

A feature of the present invention is that not only can one predicable determine the dispersant rate by changing the flow rate but it has been found that as the number of openings are made available in the cartridge dispenser the concentration of the dispersant in the housing increases in a predictable manner.

Figure 14:
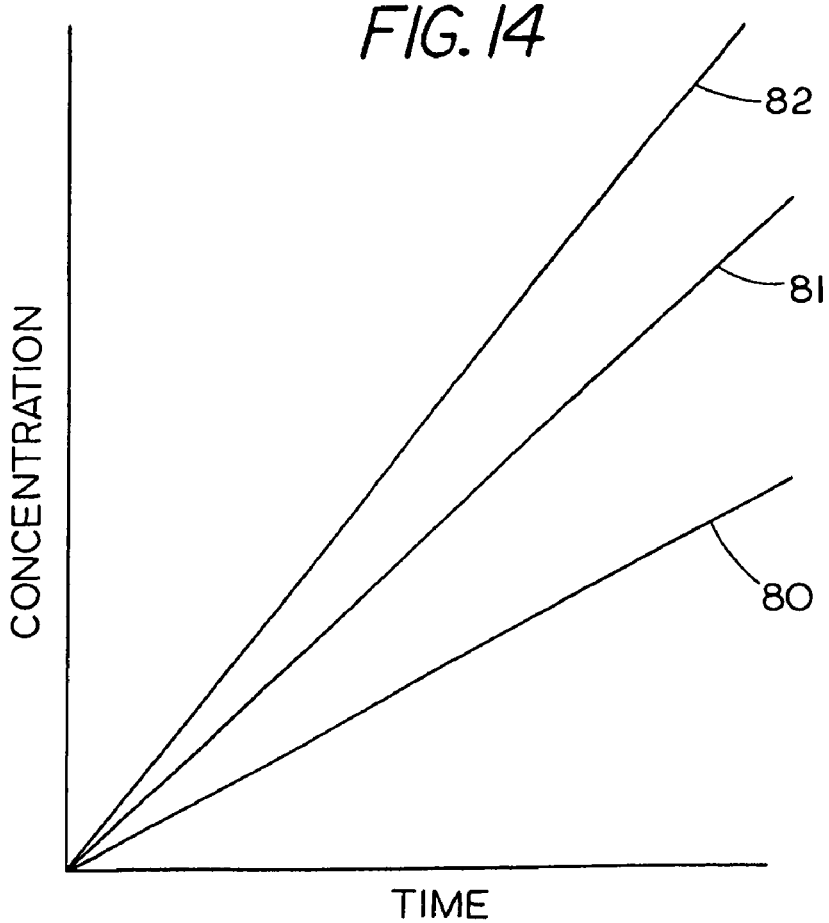
FIG. 14 is a graph of dispersant concentration as a function of time with the cartridge dispenser suspended in the cylindrical fluid chamber of FIG. 13.

FIG. 14 illustrates the concentration of the dispersant on the ordinate axis and with time on the abscissa axis. There different curves 80, 81, and 82 are shown to illustrate the dispersant rate under different size access areas in the dispersant cartridges. That is, curve 80 is the dispersant level as a function of time for a first number of access openings in cartridge 40, the curve 81 is the dispersant level as a function of time for a larger number of access opening in cartridge 40 and curve 82 is the dispersant level as a function of time for a yet larger number of access opening in cartridge 40. Thus one way to control the amount of dispersant is to increase the area of the openings into the dispersant cartridge. In still another method one can increase the flow rate through the dispersant housing which also results in an increased dispersant level. While it is not fully understood it is believed that use of a circumferential input eliminates instability in flow patterns that can occur when fluid streams impinge on objects. As a result if the flow pattern remains stable one can uniformly increase or decrease the flow rate to correspondingly increase or decrease the dispersant rate.

Thus with the present invention one can establish a stable flow pattern past the access openings which results in one being able to control the dispersant rate.

We claim:

1. A cartridge carrier comprising:
   a skeleton housing, said skeleton housing having a partial cylindrical cross section with a set of ears, said set of ears flexible to permit lateral insertion of a cartridge into the skeleton housing; and
   a sealing member for sealing the housing to an inside of a dispenser chamber.

2. The cartridge carrier of claim 1 including a topside handle thereon to remove the cartridge carrier from the dispenser chamber.

3. The cartridge carrier of claim 1 wherein the cartridge carrier comprises a polymer plastic.

4. The cartridge carrier of claim 1 wherein the cartridge carrier includes a cylindrical stop to maintain a cartridge in a fixed axial condition in the cartridge carrier during operation of cartridge carrier in a dispenser system.

5. A cartridge carrier comprising:
   a skeleton housing, said skeleton housing having a partial cylindrical cross section with a set of ears, said set of ears flexible to permit lateral insertion of a cartridge into the skeleton housing; a cartridge, said cartridge having an outer rotatable sleeve with a set of openings in an inner container, said inner container holding a water purification material.

6. The cartridge carrier of claim 1 including a first cartridge having a water purification material therein, wherein the water purification material comprises a mineral of the type for generating a metallic ion for purification of water therein.

7. The cartridge carrier of claim 6 including a second cartridge with said second cartridge containing a second water treatment material.

8. The cartridge carrier of claim 7 wherein the second water purification material is different from the first water purification material.

9. The cartridge carrier of claim 8 wherein the first water purification material contains silver chloride.

* * * * *